UNITED STATES PATENT OFFICE.

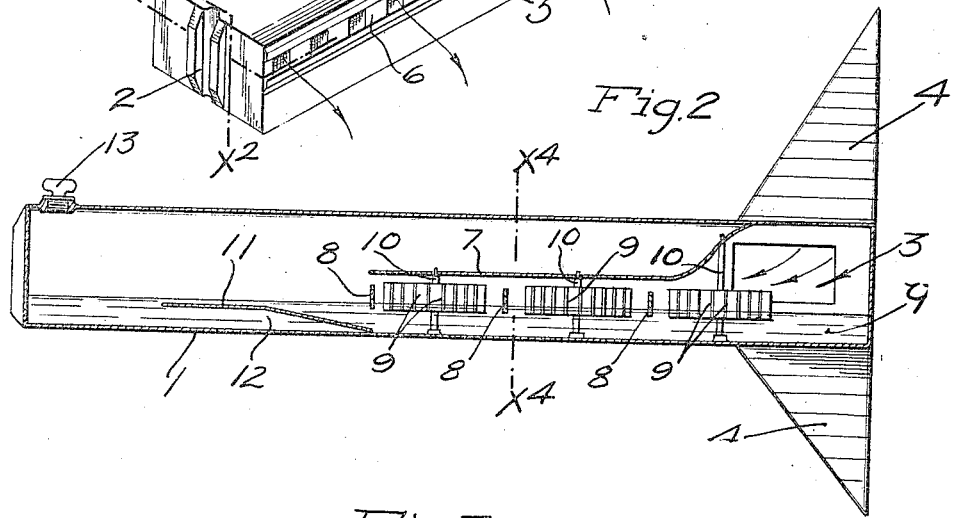

WILLIAM E. McMULLIN, OF MINNEAPOLIS, MINNESOTA.

VENTILATOR FOR CARS.

1,142,110.

Specification of Letters Patent. Patented June 8, 1915.

Application filed August 10, 1914. Serial No. 355,959.

*To all whom it may concern:*

Be it known that I, WILLIAM E. McMULLIN, a citizen of the United States, residing at Minneapolis, in the county of Hennepin and State of Minnesota, have invented certain new and useful Improvements in Ventilators for Cars; and I do hereby declare the following to be a full, clear, and exact description of the invention, such as will enable others skilled in the art to which it appertains to make and use the same.

My invention has for its object to provide a simple and highly efficient ventilator and humidifier, especially adapted for application to a car window, and which, when in operation, insures a forced ventilation or supply of fresh air into the car, and which will remove from the air all smoke, cinders and dirt, and which, furthermore, will moisten, more or less, the clean, pure air introduced into the car.

Generally stated the invention consists of the novel devices and combination of devices hereinafter described and defined in the claims.

In accordance with my invention, I provide an air intake box or casing which is insertible into the opening of a car window under a partly raised sash. This box is provided with a flaring air intake head at its front outer portion, and with air discharge ports on its inner side. The box is constructed to hold a limited amount of water, and within the box is a plurality of agitating wheels that are partly immerged in the water and are arranged to be rotated by the force of the draft of air which is directed through the box. These agitating wheels increase the agitation of the water which is also agitated by the motion of the train, and, furthermore, serve as deflectors which cause precipitation of all of the solid or impure particles such as cinders, dirt and smoke particles, into the water, so that they will be held by the water, leaving only the pure-clean air to pass into the car.

The invention also involves certain other important features which will be hereinafter described and defined in the claims.

In the accompanying drawings which illustrate the invention, like characters indicate like parts throughout the several views.

Referring to the drawings: Figure 1 is a perspective view showing the improved ventilator; Fig. 2 is a vertical section taken approximately on the line $x^2$ $x^2$ on Fig. 1. Fig. 3 is a horizontal section taken approximately on the line $x^3$ $x^3$ on Fig. 1; and Fig. 4 is a transverse section taken on the line $x^4$ $x^4$ on Fig. 2.

The numeral 1 indicates an elongated rectangular box or casing of a length to fit the car window, and provided at its ends with vertical channels 2 adapted to receive one of the stop strips of the window frame to thereby hold the said box in working position. At the front end of its outer side the box 1 is provided with a large air intake port 3 that leads to a laterally offset vertically extended and forwardly flaring air intake head 4. At its inner side, near its top, the box 1 is provided with a plurality of air discharge ports 5 that are adapted to be opened and closed to any desired extent by a perforated sliding damper plate 6.

Secured within the box 1 and extending from the front portion of the top plate thereof, down to a point below the ports 5, and from thence, approximately to the center of the box, is a horizontal partition plate 7. The space below the said plate 7 is partially divided into three compartments by transverse baffle strips 8 that extend from side to side of the box, but are spaced, both from the bottom thereof, and from the horizontal partition 7. Within each of the said compartments just noted, is one of three agitating wheels 9 having upright spindles 10, loosely journaled in the partition plate 7, and in suitable bearings on the bottom of the box 1. Obviously, more or less of these agitating wheels may be employed. Each wheel has a multiplicity of radial blades, the lower edges of which work somewhat below the surface of the water $y$ which is contained within the box 1. The lower edges of the baffle strips 8 also preferably extend down into the water $y$.

Within that portion of the box 1 which is at the rear of the horizontal partition 7, is another horizontal partition 11, the main body portion of which is spaced above the bottom of the box, but the forwardly extended portion of which is inclined, so that it meets the bottom of the box, and thereby affords a cinder accumulating compartment 12 below the same. The numeral 13 indicates a plug which normally closes an opening in the top of the box, through which water may be introduced into the said box.

The operation of the device described is substantially as follows: Under forward movement of the train, air caught in the head 4 will be forced into and through the box 1. This air, laden with more or less smoke, dirt and cinders, is caused to pass below the horizontal partition 7, and into direct contact, either with the water or with the agitating wheels 9, or with the baffle strips 8, so that all of the solid particles of impurities will be brought into contact with the water at some time, and caught and held by the water. Furthermore, the agitation of the water produced by the motion of the car and by the rotation of the agitating wheels greatly increases the tendency of the water to take up the impurities, and also to moisten, more or less, the pure air that is passed into the car. The forward and rearward motion of the water within the box has the constant tendency of carrying the cinders and solid particles from the front portion of the box, over the partition 11 and to the rear end of the box, where they will work into the compartment 12 under the said partition 11, and there held until removed. The cinders and dirt can be removed when the box is removed from the window and turned on its side, simply by rattling the cinders out through air port 5. Obviously, the water will also be poured out through the ports 5 in the operation of removing the cinders. Probably fresh water would be supplied after each trip, but may of course, be supplied when desired. In cold weather when water would freeze, the ventilator may be turned end for end, that is, with its flaring head turned rearward, and may then be used to draw the air out of the car under the forward movement of the train. The above reversal of the ventilators requires the ventilators to be interchanged from one side to the other of the car.

The ventilator, while especially adapted for application to a car window, may, nevertheless, be applied to windows of houses or other buildings, and furthermore, certain of the novel features involved in this ventilator, may be incorporated in various different parts of a car or building other than window opening.

The improved ventilator described, has been constructed and put into actual use, and has been found highly efficient for the purposes had in view. Preferably, all of the main parts thereof, are constructed from thin sheet metal, but, of course, they may be made of any suitable material. It is also important to note that the bottom of the air inlet port 3 is below the tops of the agitating wheels 9 and above the bottoms thereof, so that it will serve as an overflow for the water to thereby prevent the box 1 from being filled to too great a depth with the water. Otherwise stated, it is impossible to flood or completely submerge the said agitating wheels, and hence, the upper portions thereof will always be exposed to the draft of air that is forced through the box.

It is important to note that the horizontal partition plate 7 is located below the ports 5. This arrangement prevents the water from being splashed out through the said ports into the car and it causes the air to pass rearward of the agitating wheels before it can possibly pass through the said ports 5 into the car. The raised baffle strips 8, in addition to functions already noted, prevent surging of the water to and fro within the box of the ventilator.

What I claim is:

1. A ventilator comprising a box constructed to contain water and having an intake port at one end of its outer side and having a discharge port at its inner side, whereby an air current will be directed through said box, and a rotary agitating wheel within said box freely mounted to rotate on a vertical axis with its lower portion immersed in water and with its upper portion projecting above the water, the axis of said wheel being at one side of the center line of the air current passed through said box, whereby said wheel will be rotated by the said air current, and the water will be positively agitated.

2. A ventilator comprising a box constructed to contain water and provided at the end of its outer side with an intake port and at its inner side with a discharge port, whereby an air current will be directed through said box, a plurality of rotary agitating wheels within said box freely mounted to rotate on vertical axes with their lower portions immersed in the water and their upper portions projecting above the water, said wheels having their axes offset from the center line of air current forced through said box, and a baffle strip extended transversely of said box between said wheels, with their lower edges spaced above the bottom of the box.

3. A ventilator comprising a box having an intermediate horizontal partition terminating forward of its rear end and provided at the front end of its outer side with an intake port directing air into said box below said partition, said box having discharge ports at its inner side, certain of which are located above said partition, and a cinder accumulating chamber on the bottom of said box extended rearward of said partition, having a top plate inclined toward the front end of said box and joining the bottom thereof, the said chamber being open at its rear end.

4. A ventilator comprising a box having an intermediate horizontal partition terminating forward of its rear end and provided at the front end of its outer side with an intake port directing air into said box below said partition, said box having a discharge port at its inner side located above said partition, and a rotary agitating wheel within said box below said partition mounted and rotated on a vertical axis with its lower portion immersed in water and its upper portion projecting above the water, the axis of said wheel being at one side of the central line of the air current passed through said box from said inlet port to said discharge port, whereby said wheel will be rotated by said air current and the water will be positively agitated.

5. A ventilator comprising a box having an intermediate horizontal partition terminating forward of its rear end and provided at the front end of its outer side with an intake port directing air into said box below said partition, said box having a discharge port at its inner side located above said partition, and a rotary agitating wheel within said box below said partition mounted and rotated on a vertical axis with its lower portion immersed in water and its upper portion projecting above the water, the axis of said wheel being at one side of the central line of the air current passed through said box from said inlet port to said discharge box, whereby said wheel will be rotated by said air current and the water will be positively agitated, and a cinder accumulating chamber located on the bottom of said box and extended rearward of said horizontal partition and having its upper wall forwardly inclined and joined to the bottom of said box but open at its rear end to permit cinders, and the like, to be washed into the same.

In testimony whereof I affix my signature in presence of two witnesses.

WILLIAM E. McMULLIN.

Witnesses:
HARRY D. KILGORE,
F. D. MERCHANT.